(12) United States Patent
Hansen

(10) Patent No.: US 9,989,036 B2
(45) Date of Patent: Jun. 5, 2018

(54) WIND TURBINE BLADE LIGHTNING BYPASS SYSTEM

(71) Applicant: LM WP PATENT HOLDING A/S, Kolding (DK)

(72) Inventor: Lars Bo Hansen, Agerskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 583 days.

(21) Appl. No.: 14/405,081

(22) PCT Filed: May 27, 2013

(86) PCT No.: PCT/EP2013/060867
§ 371 (c)(1),
(2) Date: Dec. 2, 2014

(87) PCT Pub. No.: WO2013/182447
PCT Pub. Date: Dec. 12, 2013

(65) Prior Publication Data
US 2015/0167642 A1    Jun. 18, 2015

(30) Foreign Application Priority Data

Jun. 4, 2012    (EP) ..................................... 12170679

(51) Int. Cl.
*F03D 1/06*    (2006.01)
*F03D 7/02*    (2006.01)
(Continued)

(52) U.S. Cl.
CPC ........ *F03D 11/0033* (2013.01); *F03D 1/0658* (2013.01); *F03D 1/0675* (2013.01);
(Continued)

(58) Field of Classification Search
CPC ...... F03D 1/001; F03D 1/0658; F03D 1/0675; F03D 7/0224; F03D 80/30;
(Continued)

(56) References Cited

U.S. PATENT DOCUMENTS 5,175,665 A * 12/1992 Pegg ...................... B64D 45/02
244/1 A
2009/0038819 A1 * 2/2009 Molbech ................ H02G 13/00
174/2

(Continued)

FOREIGN PATENT DOCUMENTS

CN     102354910 B    10/2015
DE   102008045939 A1    3/2010
(Continued)

OTHER PUBLICATIONS

Machine translation of (DE 102008045939 A1—Mar. 11, 2010) from Espacenet.*

*Primary Examiner* — Jason Shanske
*Assistant Examiner* — Christopher R Legendre
(74) *Attorney, Agent, or Firm* — Nath, Goldberg & Meyer; Jerald L. Meyer; Tanya E. Harkins

(57) ABSTRACT

A wind turbine blade is described having a lightning bypass system located at the root end of the blade. The lightning bypass system comprises a stay bolt formed from an electrically insulating material having a conductive core. The conductive core of the stay bolt provides a conductive path for a lightning down conductor system through the root end of a wind turbine blade to the turbine hub or nacelle, bypassing any sensitive root end components of the wind turbine blade.

18 Claims, 4 Drawing Sheets

Figure 1:
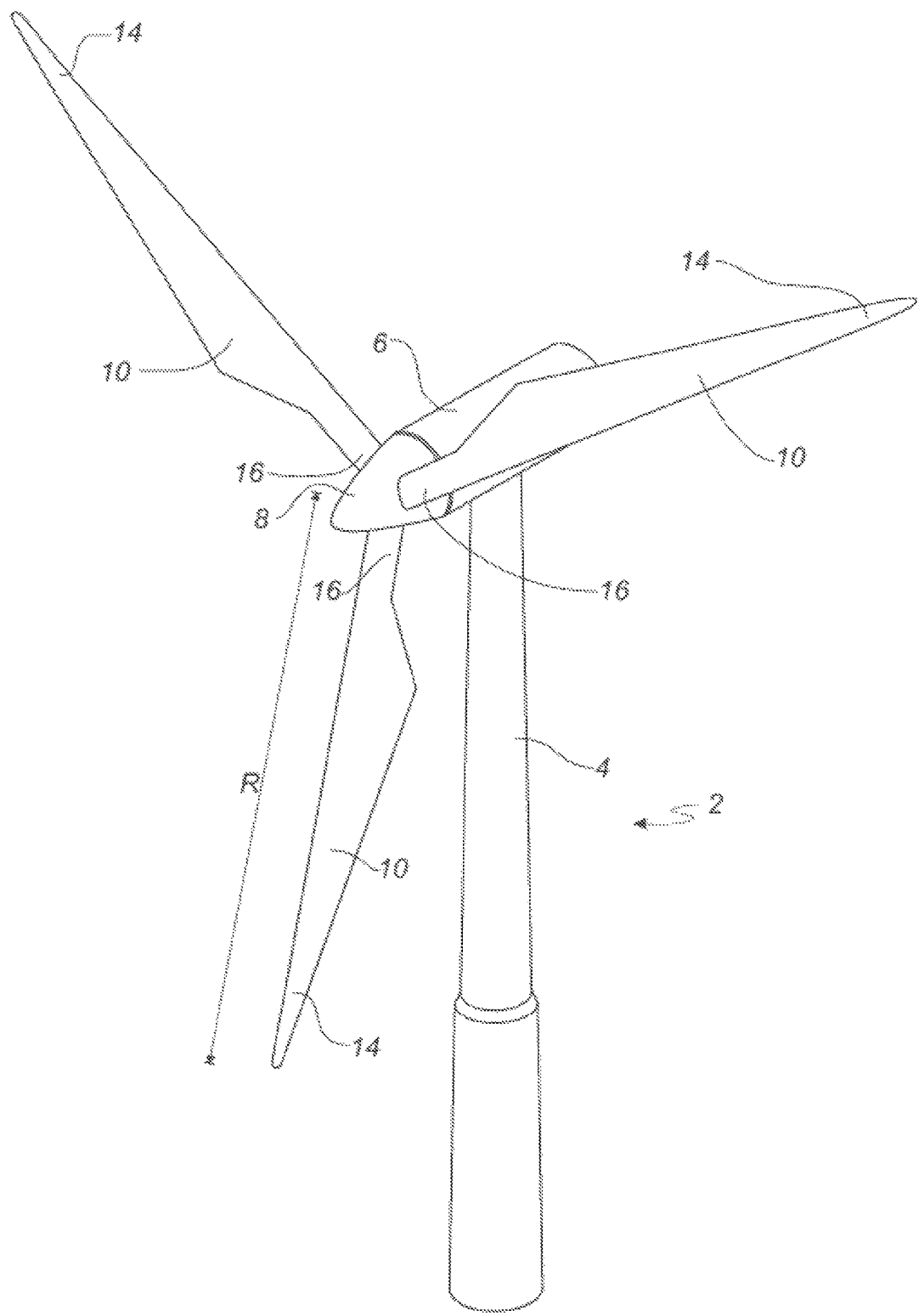

(51) Int. Cl.
  *F03D 11/00*    (2006.01)
  *F03D 80/30*    (2016.01)
  *F03D 13/10*    (2016.01)
(52) U.S. Cl.
  CPC ........... *F03D 7/0224* (2013.01); *F03D 13/10* (2016.05); *F03D 80/30* (2016.05); *F05B 2260/301* (2013.01); *Y02E 10/721* (2013.01); *Y10T 29/49117* (2015.01)
(58) Field of Classification Search
  CPC . F05B 2260/301; Y02E 10/721; B64D 45/02; Y10T 29/49117
  See application file for complete search history.

(56) References Cited

U.S. PATENT DOCUMENTS

2010/0290912 A1* 11/2010 Sorensen ............. F03D 1/0658
              416/204 R
2011/0182731 A1*  7/2011 Naka .................. F03D 80/30
              416/1
2015/0167642 A1*  6/2015 Hansen ............... F03D 11/0033
              416/146 R

FOREIGN PATENT DOCUMENTS

| DE | 202010013535 U1 | 12/2010 | | |
|----|---|---|---|---|
| EP |      2503145 A2 |  9/2012 | | |
| JP |     2010-59813 A |  3/2010 | | |
| WO |   2004/001224 A1 | 12/2003 | | |
| WO | WO 2010100283 A1 * |  9/2010 | ........... | F03D 1/0675 |

\* cited by examiner

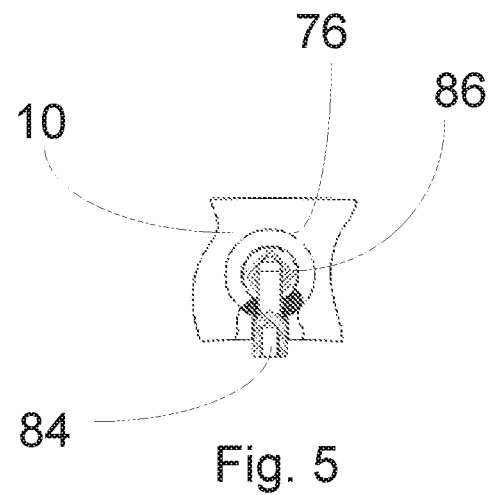
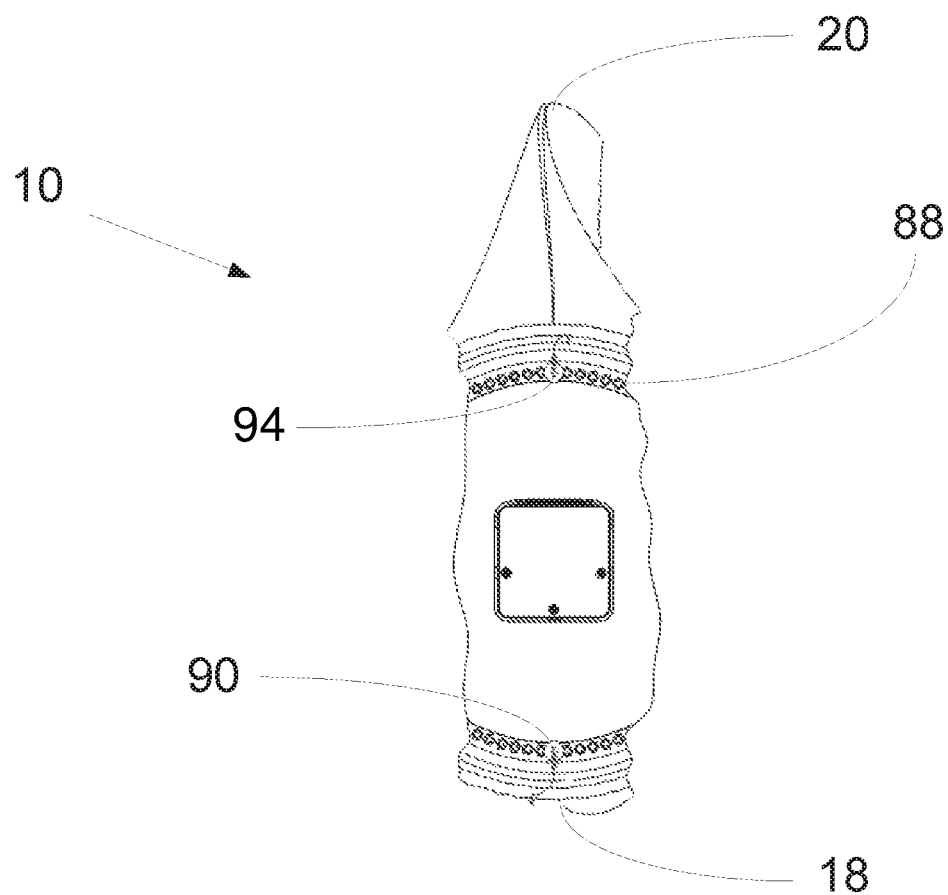

WIND TURBINE BLADE LIGHTNING BYPASS SYSTEM

This is a National Phase Application filed under 35 U.S.C. 371 as a national stage of PCT/EP2013/060867 filed May 27, 2013, and claims priority benefit from European Application No. 12170679.0, filed Jun. 4, 2012, the content of each of which is hereby incorporated by reference in its entirety.

FIELD OF THE INVENTION

The present invention relates to a wind turbine blade having a lightning protection system, in particular a lightning bypass system for a wind turbine blade to provide a lightning strike in a wind turbine blade with a path to ground which bypasses sensitive wind turbine components.

BACKGROUND OF THE INVENTION

One of the challenges in wind turbine blade design is the provision of effective lightning protection systems. Such systems generally take the form of a lightning receptor provided on the exterior of a blade, usually at the tip end of the blade, the receptor coupled to a lightning down conductor located inside of the blade. The receptor acts to receive a lightning strike, which is conducted through the down conductor to the blade root end, at which point the lightning protection system is coupled to a ground connection provided on the greater wind turbine tower structure.

Various different types of connection systems are known for the connection of a lightning down conductor to a suitable ground connection at a blade root end, in particular to route a lightning strike around any sensitive blade components at the blade root, e.g. a pitch system. One known system is that of a spark gap solution, where a lightning down conductor is coupled to an external conductive plate spaced from the blade root end. A flexible arm extends from the wind turbine hub or nacelle, and is provided adjacent the external plate. A spark gap between the plate and a conductive element in the arm provides a conductive path to ground for a lightning strike in the wind turbine blade, the path to ground avoiding the root end components of the blade.

An alternative system is described in German patent application number DE 10 2008 045 939, which discloses a lightning bypass system wherein a lightning current can be routed through a securing T-bolt at the blade root end. The T-bolt passes through an aperture in the blade pitch system into the internal space of the wind turbine hub, wherein a lightning current is arranged to couple to a subsequent ground connection, e.g. through a subsequent spark gap connection. However, while the aperture through the pitch system may be provided with an insulating material between the T-Bolt and the pitch system, the use of such an arrangement will present problems due to ingress of moisture into spaces between the system interfaces, resulting in the formation of artificial spark gaps between the pitch system components and the lightning path to ground. Such spark gaps may result in damage to the relatively sensitive components of the wind turbine system in the event of a lightning strike.

Accordingly, it is an object of the invention to provide a wind turbine blade lightning bypass system which can more effectively conduct a lightning strike to ground without damaging sensitive blade components.

SUMMARY OF THE INVENTION

Accordingly, there is provided a lightning bypass system for a wind turbine blade, the lightning bypass system comprising:

at least one stay bolt or connector formed from an electrically insulating material, the insulating stay bolt arranged to extend from a root end of a wind turbine blade to a hub of a wind turbine, wherein the insulating stay bolt comprises a core of electrically conductive material, the lightning bypass system arranged to conduct a lightning current from a wind turbine blade to a wind turbine hub through said electrically conductive core.

By using at least one electrically-insulated stay bolt with a conductive core, it is possible to provide a lightning bypass solution for a wind turbine blade which can be relatively easily incorporated into an existing wind turbine blade design, and which has sufficient insulation to prevent damage to the wind turbine blade, particularly the root end or a wind turbine blade, when conducting a lightning strike using the bypass system. It will be understood that the system may also be used to conduct lightning current from the root end of a wind turbine blade to an element which may be provided on a wind turbine hub, e.g. a hub extender device projecting from a wind turbine hub.

Such an insulating stay bolt ensures that there is no cross-over of lightning from the electrically-conductive stay bolt core to the surrounding elements of the wind turbine, by providing a suitable layer of insulation around the conductive path through the interior of the stay bolt. The insulating effect of the stay bolt extends from a first end located within the body of the wind turbine blade, to a second end which preferably projects clear of any potentially conductive mounting elements, thereby providing a clear distance from where the conductive core is exposed to any conductive components of the wind turbine, e.g. a metallic pitch system, thereby significantly reducing the possibility of a lightning flashover from the conductive core to any other conductive elements.

This is in contrast to prior art systems, wherein a conductive bolt is used with a relatively thin insulation layer provided only between the conductive material and a conductive pitch system, which does not prevent flashovers of lightning current at the edges of the insulating sleeve, and is also more susceptible to failure in the relatively thin insulating sleeve.

By stay bolt, it will be understood that this is interpreted as a bolt or other suitable connector used for the coupling of elements in a wind turbine.

Preferably, the at least one insulating stay bolt is arranged to be coupled to a mounting element provided at the hub of a wind turbine, wherein the at least one stay bolt comprises a first end to be embedded in the root end of a wind turbine blade and a second end to project from said root end of the wind turbine blade to couple with said mounting element, wherein said second end of said at least one insulating stay bolt is arranged to project through said mounting element and stand proud of said mounting element.

By arranging the insulating stay bolt to extend through the hub-side mounting element, such that the second end of the insulating stay bolt is spaced from the mounting element, accordingly the risk of flashover from the second end of the core of the stay bolt to the mounting element is significantly reduced doe to the increased spacing between the conductive elements. Furthermore, the possibility of the formation of effective spark gaps between components due to ingress of moisture, etc. is also reduced.

It will be understood that the mounting element may comprise any suitable coupling mechanism between a wind turbine blade and a wind turbine rotor hub or hub extender, and which may be conductive, e.g. a blade pitch system, a mounting flange, etc.

Preferably, the diameter of the conductive core is less than half the total diameter of the stay bolt including the conductive core.

By providing an insulating stay bolt or connector where the outer insulating body of the stay bolt extends for a relatively substantial distance around the insulating core, the insulating properties of the conductive path to ground for a lightning strike are improved, as there is a reduced risk of failure of the insulating outer layer of the stay bolt.

There is also provided a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the wind turbine blade further comprising at least one lightning receptor, and a bolt circle comprising a plurality of stay bolts provided at said root end for coupling said wind turbine blade to a wind turbine hub, wherein the wind turbine blade further comprises a lightning bypass system comprising at least one stay bolt provided in said bolt circle formed from an electrically insulating material, the stay bolt having a core of electrically conductive material, the stay bolt having a first end embedded in the root end of said wind turbine blade and a second end projecting from said root end, wherein the electrically conductive core of said at least one stay bolt is conductively coupled to said at least one lightning receptor, the lightning bypass system operable to conduct a lightning current received by said at least one lightning receptor in said electrically conductive core to a wind turbine hub.

As the lightning bypass solution can be easily incorporated into the bolt circle of an existing wind turbine blade, a secure and reliable method of conducting lightning current from the root end of the wind turbine blade without damage of root end elements of the blade can be provided. As the conductive path is provided in the core of an electrically insulated stay bolt, the reliability of the bypass system is improved over prior art systems using flexible insulating sleeves or covers. The electrically conductive core may be connected to a lightning grounding system provided in a wind turbine hub. Preferably, the electrically conductive core of said at least one stay bolt is conductively coupled to said at least one lightning receptor via a lightning down conductor or conductive cable provided in the wind turbine blade.

Preferably, the at least one insulating stay bolt is arranged to be coupled to a mounting element provided at the hub of a wind turbine, wherein the at least one stay bolt comprises a first end to be embedded in the root end of a wind turbine blade and a second end to project from said root end of the wind turbine blade to couple with said mounting element, wherein said second end of said at least one insulating stay bolt is arranged to project through said mounting element and stand proud of said mounting element.

Preferably, said lightning bypass system comprises at least two stay bolts having an electrically conductive core, wherein said at least two stay bolts are equidistantly spaced around the circumference of the bolt circle at said root end.

The total conductivity of the lightning bypass system may be increased by utilizing a plurality of stay bolts having electrically conductive cores at the root end bolt circle. The different conductive cores provide separate conductive paths or loops for the lightning to be conducted through the pitch system to ground. In such a case, the stay bolts of the bypass system are preferably equally spaced around the circumference of the bolt circle, so as to reduce the loading experienced by the stay bolts of the bypass system.

In a particularly preferred embodiment, said lightning bypass system comprises a first stay bolt having an electrically conductive core and a second stay bolt having an electrically conductive core, wherein said first and second stay bolts are located at opposite sides of said bolt circle at said root end.

In such a system, the lightning current flowing though each path or loop of the bypass system is halved, further reducing the possibility of a lightning strike damaging the components of the bypass system.

Preferably, said first stay bolt having an electrically conductive core is located in said bolt circle adjacent the leading edge of said wind turbine blade, and said second stay bolt having an electrically conductive core is located in said bolt circle adjacent the trailing edge of said wind turbine blade.

Providing the two spaced paths or loops at opposed edges of the wind turbine blade results in reduced mechanical loads acting on the stay bolts, reducing the possibility of stay bolt failure.

Alternatively, said lightning bypass system comprises a single stay bolt having an electrically conductive core, wherein said single stay bolt having an electrically conductive core is located in said bolt circle adjacent the leading edge or the trailing edge of the wind turbine blade.

In these embodiments, the stay bolt or bolts are located at the leading edge and/or trailing edges of the blade, where the loading experienced by the bolt circle is at a minimum, thereby ensuring that the loading experienced by the stay bolt or bolts of the lightning bypass solution is minimized.

Preferably, said lightning bypass system comprises at least one blade root bushing provided in the root end of said wind turbine blade, wherein said at least one stay bolt having an electrically conductive core is partly received in said at least one blade root bushing, wherein said at least one blade root bushing is formed from an electrically insulating material.

The use of a blade root bushing of an electrically insulating material provides additional protection from any damage which may occur to the root end of the blade due to the conduction of a lightning current through the bypass system.

Preferably, said wind turbine blade comprises a pitch system provided at the root end of said wind turbine blade, said pitch system arranged to couple with said plurality of stay bolts of said bolt circle at said root end, wherein said at least one stay bolt having an electrically conductive core extends through said pitch system, such that said lightning bypass system is operable to conduct a lightning current received by said at least one lightning receptor through said pitch system in said electrically conductive core to a wind turbine hub.

As the conductive core of the stay bolt extends through the pitch system of the blade, this provides a simple, secure and effective system for the passage of lighting current from a wind turbine blade to ground to bypass the blade pitch system without damaging the pitch system components.

Preferably, said second end of said at least one stay bolt is arranged to couple with a lightning grounding system provided in a wind turbine blade hub. Preferably, said lightning grounding system comprises a spark gap system.

Preferably, said electrically conductive core projects from said second end of said at least one stay bolt.

As the electrically conductive core of the stay bolt projects proud of the second end of the stay bolt, this allows for relatively easy connection of the electrically conductive core to a suitable grounding system in the hub.

Preferably, the lightning bypass system comprises an anti-flashover insulator provided at said second end of said at least one stay bolt.

Preferably, the wind turbine blade comprises at least one internal lightning down conductor extending from said at least one lightning receptor to a connecting element, said connecting element extending from the interior of said wind turbine blade to a contact point with the electrically conductive core of said at least one stay bolt of said lightning bypass system.

In one embodiment, said first end of said at least one stay bolt comprises a head element formed from a conductive material connected to said electrically conductive core, wherein said connecting element is provided in contact with said head element to form a conductive path from said at least one lightning receptor to said electrically conductive core.

Preferably, the ratio of the diameter of the electrically conductive core to the total diameter of the at least one stay bolt of the lightning bypass system is approximately 1:3.

The use of such a construction ensures that any faults or breakages in the insulating material are prevented, eliminating the chance of damage to the wind turbine components during a lightning strike. In general, preferably the area of the electrically conductive core, preferably a copper core, is at least 50 mm² for a lightning down conductor path. If two electrically conductive cores are used in an embodiment, preferably the area of each separate electrically conductive core is at least 25 mm².

In one embodiment, the diameter of the electrically conductive core is approximately 12 mm, and the total diameter of the at least one stay bolt having an electrically conductive core is approximately 36 mm. However, it will be understood that any suitable dimensions may be selected, based on the constructional requirements of the wind turbine blade.

Preferably, said at least one stay bolt and/or said blade root bushing of said lightning bypass system are formed from at least one of the following: a plastics material, a glass material, a ceramic material, and/or a rubber material. Preferably, said electrically conductive core and/or said head element of said lightning bypass system are formed from an electrically conductive metal element, e.g. copper.

There is also provided a wind turbine comprising at least one wind turbine blade as described above.

There is further provided a method of providing a lightning bypass system in a wind turbine blade, the method comprising the steps of:
  providing at least one stay bolt formed from an electrically insulating material having a core of electrically conductive material in a bolt circle located at the root end of a wind turbine blade, and
  conductively coupling said electrically conductive core with at least one lightning receptor of the wind turbine blade to conduct a lightning current received by said at least one lightning receptor through said electrically conductive core to a lightning grounding system of a wind turbine.

Preferably, said at least one insulating stay bolt is arranged to be coupled to a mounting element provided at the hub of a wind turbine, and wherein the method comprises the step of arranging said at least one insulating stay bolt to project from said bolt circle such that said at least one insulating stay bolt projects through said mounting element, a free end of said at least one insulating stay bolt standing proud of said mounting element for connection of the electrically conductive core of said at least one insulating stay bolt at said free end to a lightning grounding system of a wind turbine.

By arranging the stay bolt or connector to project freely from the mounting element, e.g. a blade root end flange, a pitch system, etc., the risk of a flashover from the conductive core at the free end of the bolt is reduced. This may be further ameliorated through the use of suitable flashover prevention connectors, etc., at the free end. It will be understood that the mounting element may comprise an electrically conductive material.

DESCRIPTION OF THE INVENTION

Figure 2:
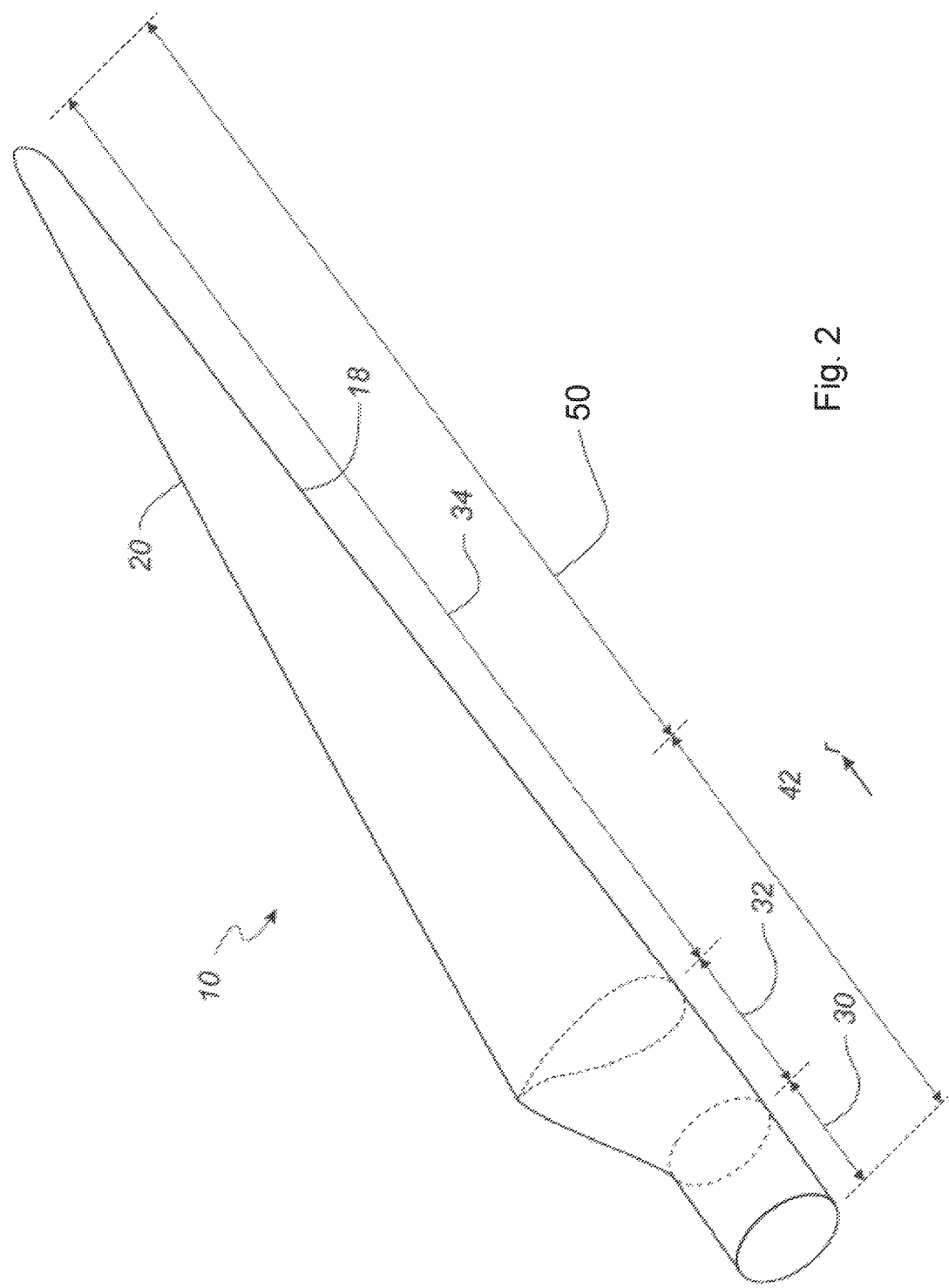
Figure 3:
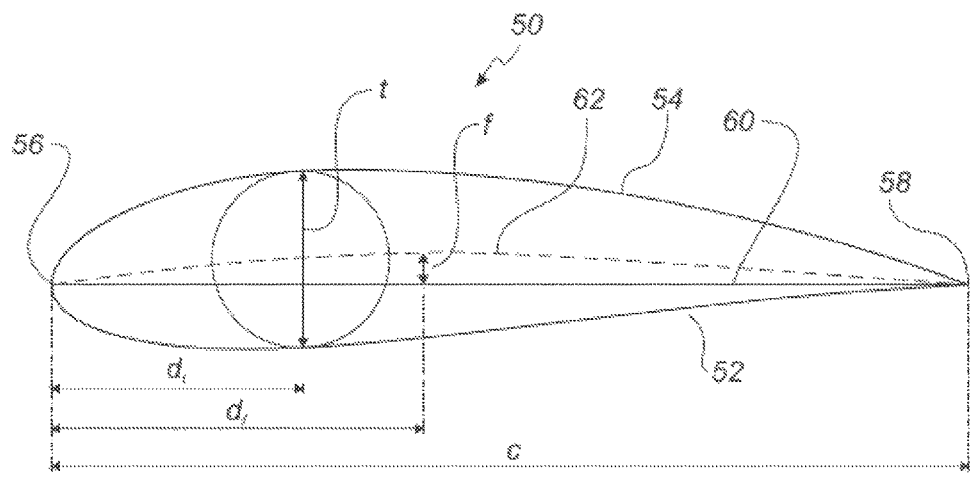
Figure 4:
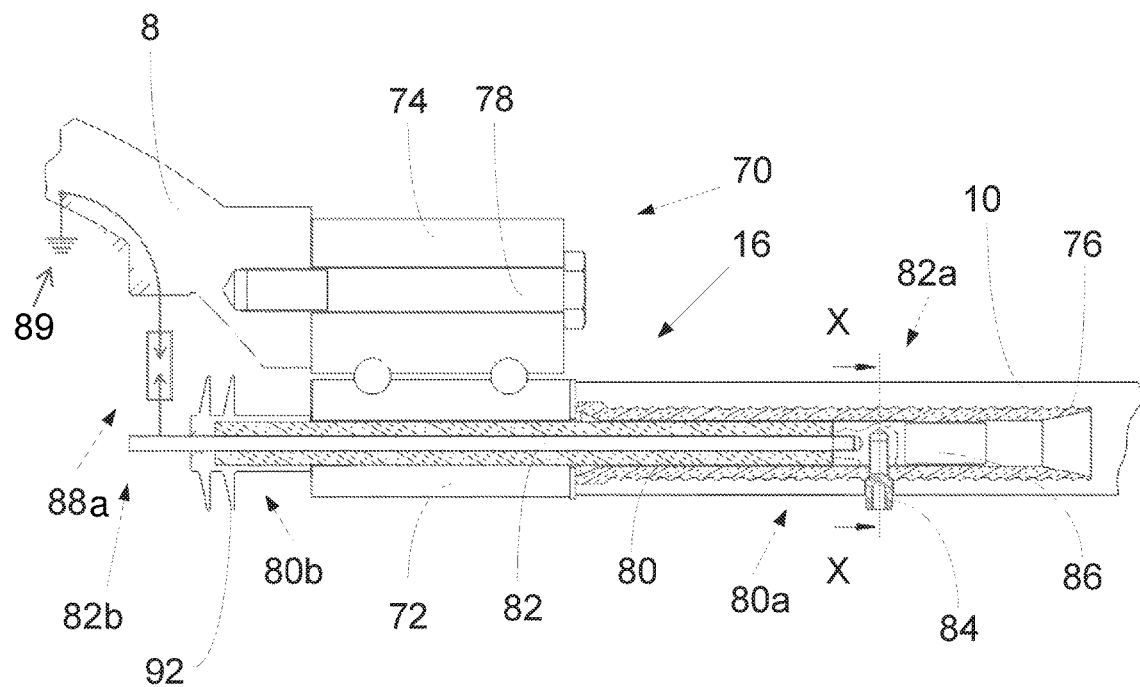

Embodiments of the invention will now be described, by way of example only, with reference to the accompanying drawings, in which:
  FIG. 1 shows a wind turbine;
  FIG. 2 shows a schematic view of a wind turbine blade;
  FIG. 3 shows a schematic view of an airfoil profile of the blade of FIG. 2;
  FIG. 4 illustrates a cross-sectional view of a lightning bypass system according to the invention;
  FIG. 5 is a cross-sectional view across the plane X-X of FIG. 4; and
  FIG. 6 is a sectional view of a root end of a wind turbine blade comprising an embodiment of the lightning bypass system of FIG. 4.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centers of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

A cross-sectional view of a lightning bypass system according to the invention is illustrated in FIG. 4. FIG. 4 shows an enlarged view of the interface between a section of a wind turbine blade root end 16 and a wind turbine hub 8. A pitch system 70 is located between the wind turbine blade 10 and the hub 8, the pitch system 70 comprising an inner pitch ring 72 coupled to the blade root end 16 and an outer pitch ring 74 coupled to the turbine hub 8 via bolts 78. The inner ring 72 is pitchable relative to the outer ring 74, allowing for the wind turbine blade 10 to be pitched based on wind conditions at the wind turbine location. The pitch system 70 is generally formed from a metallic, electrically conductive material.

In general, a plurality of blade root bushings 76 are located about the circumference of the wind turbine blade root 16, the bushings 76 arranged to receive a plurality of blade root bolts (not shown) to couple the inner pitch ring 72 to the blade root end 16, said blade root bolts generally formed from a metallic, electrically conductive material. Furthermore, the outer pitch ring 74 is coupled to the turbine hub 8 using a plurality of through-going bolts 78. Preferably, said blade root bushings 76 are formed of an insulating, non-conductive material, e.g. a plastics material, a glass material, a ceramic material, and/or a rubber material.

With reference to FIG. 4, for the lightning bypass system, at least one blade root bolt is replaced with a stay bolt 80 formed from an insulating material, i.e. non-conducting, e.g. rubber, plastics, ceramics, glass. A first blade root end 80a of the insulating stay bolt 80 is received in the blade root bushing 76, the insulating stay bolt 80 arranged to extend through a bolting aperture provided in the inner pitch ring 72. A second distal end 80b of the insulating stay bolt 80 projects beyond the opposed surface of the inner pitch ring 72, into the internal space defined inside the wind turbine hub 8.

The insulating stay bolt 80 is provided with a central core 82 formed from a conductive material, e.g. a metallic conductor such as copper, steel, aluminium, silver, etc. The conductive central core 82 comprises a first end 82a located within the blade root bushing 76, the core 82 extending through the center of the insulating stay bolt 80 to a second distal hub end 82b located beyond the distal end 80b of the insulating stay bolt 80, the second distal hub end 82b of the core 82 located within the internal space defined by the hub 8.

A lightning down conductor (not shown) is provided within the interior of the wind turbine blade 10, and extends from at least one lightning receptor (not shown) provided on the blade 10. At the root end 16 of the blade 10, the down conductor is conductively coupled to a connecting element 84. The connecting element 84 extends from the interior of the wind turbine blade 10, through a portion of the side wall of the body of the wind turbine blade 10, and into the interior of the blade root bushing 76 of the lightning bypass system. The connecting element 84 is conductively coupled to the first end 82a of the conductive central core 82 of the insulating stay bolt 80.

In the embodiment shown in FIG. 4, the first end of the insulating stay bolt 80a located within the blade root bushing 76 may be replaced with a head portion 86 formed of a conductive material, the head portion 86 having a suitably dimensioned aperture arranged to receive and mechanically couple with a projecting portion of said connecting element 84, to provide a secure and robust connection between the conductive core 82 and the connecting element 84. FIG. 5 illustrates a cross-sectional view of the connecting element 84 of FIG. 4 when received in said head portion 86 within said bushing 76, when taken across the line X-X of FIG. 4.

The second end 82b of the conductive core 82 is arranged to couple with a down-conducting system 88a provided in the wind turbine hub 8, the down-conducting system 88a operable to conduct a lightning current to ground 89. In the embodiment shown in FIG. 4, the down-conducting system 88a is arranged as a spark gap connection to a ground circuit, but it will be understood that any suitable down-conducting system 88a may be used.

The second end 82b of the conductive core 82 may be provided with an anti-flashover insulator 92, the anti-flashover insulator 92 arranged to prevent any flashovers from said second end 82b towards the conductive components provided at the blade root end 16, e.g. the pitch system 70. The anti-flashover insulator 92 may comprise a cap element fitted over said second end 82b, the cap comprising at least one projecting collar or ring formed form an insulating material.

Accordingly, the lightning bypass system of the invention provides a conductive path from blade lightning receptors arranged on the wind turbine blade 10, through the down conductor, connecting element 84 and conductive central core 82 of the stay bolt 80, to the second distal hub end 82b of the conductive core 82. This arrangement provides a conductive path for a lightning strike on the wind turbine blade 10 which prevents contact with any of the sensitive components of the wind turbine located at the blade root 16, and which may be conducted to ground using a suitable down-conducting system 88a located in the wind turbine hub 8 or nacelle 6. The use of a stay bolt 80 formed of an insulating material, having a conductive core 82, provides a lightning bypass system which is relatively simple to install and may be easily fitted to existing wind turbine blades having at least one non-conductive blade root bushing without significant alteration, while preventing the occurrence of any flashover effects if subjected to a lightning strike.

With reference to FIG. 6, a sectional view of a preferred embodiment of a wind turbine blade having a lightning bypass system according to the invention is illustrated, showing the bolt circle 88 provided at the root end 16 of a wind turbine blade 10. In the embodiment of FIG. 6, the lightning bypass system comprises respective first and second insulating stay bolts 90, 94 having conductive cores, as illustrated in FIG. 4, said first and second stay bolts 90, 94 spaced in the bolt circle 88 provided at the root end 16 of the wind turbine blade 10. The first and second stay bolts 90, 94 are conductively coupled in parallel to the lightning down conductor system of the wind turbine blade 10, for conducting a lightning strike in the blade to a suitable ground connection in the wind turbine hub 8. The provision of more than one stay bolt having a conductive core to conduct a lightning strike in parallel in separate conductive paths at the blade root end 16 means that the lightning current carried by each conductive core will be reduced, accordingly reducing the risk of damage to the components of the lightning bypass system.

Preferably, the first and second stay bolts 90, 94 are arranged such that the first stay bolt 90 is located on the blade bolt circle 88 at the point closest the leading edge 18 of the wind turbine blade 10, while the second stay bolt 94 is located on the blade bolt circle 88 at the point closest the trailing edge 20 of the wind turbine blade 10. Locating the stay bolts 90, 94 at the leading edge 18 and trailing edge 20 of the blade 10 ensures that the mechanical loads experienced by the stay bolts 90, 94 will be minimised, reducing the risk of stay bolt failure during turbine operation.

While the embodiment of FIG. 6 illustrates a lightning bypass system having two stay bolts comprising conductive cores, it will be understood that any plurality of such stay bolts may be used, with the location of such stay bolts selected to minimise the effect of mechanical loads on the system and the optimise the loads carried by the remaining bolts in the blade bolt circle 88. Furthermore, it will be understood that the system may comprise a single stay bolt having a conductive core, wherein said single stay bolt is preferably located at either the leading edge 18 or the trailing edge 20 of the blade bolt circle 88 to ensure minimum mechanical loads on the stay bolt.

It will be understood that the diameter of the conductive core and of the insulating stay bolt will be chosen to provide a suitable conductive path for a lightning strike while ensuring the components of the lightning bypass system will not experience failure or breakdown. Preferably, the ratio of the diameter of the electrically conductive core to the total diameter of the at least one stay bolt of the lightning bypass system is approximately 1:3, e.g. in one embodiment, the diameter of the electrically conductive core is approximately 12 mm, and the total diameter of the at least one stay bolt having an electrically conductive core is approximately 36 mm.

It will be understood that the lightning bypass system of the present invention may be used in combination with any other lightning down conduction system, e.g. a spark gap system provided externally of the wind turbine blade.

The invention is not limited to the embodiments described herein, and may be modified or adapted without departing from the scope of the present invention.

The invention claimed is:

1. A wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the wind turbine blade further comprising at least one lightning receptor, and a bolt circle comprising a plurality of stay bolts provided at said root end for coupling said wind turbine blade to the hub, wherein the wind turbine blade further comprises a lightning bypass system comprising at least one stay bolt provided in said bolt circle formed from an electrically insulating material, the at least one stay bolt having a core of electrically conductive material, the electrically insulating material of the at least one stay bolt extending through a bolting aperture defined by and beyond opposed ends of an inner ring of a pitch system, the at least one stay bolt having a first end embedded in the root end of said wind turbine blade and a second end projecting from said root end, wherein the electrically conductive core of each of said at least one stay bolt is conductively coupled to said at least one lightning receptor, the lightning bypass system operable to conduct a lightning current received by said at least one lightning receptor in each of said electrically conductive core to the hub.

2. The wind turbine of claim 1, wherein the wind turbine further comprises a mounting element provided coupled to said hub, wherein the wind turbine further comprises a mounting element provided coupled to said hub, wherein the second end of said at least one stay bolt is coupled with said mounting element and arranged to project through said mounting element and stand proud of said mounting element.

3. The wind turbine blade of claim 1, wherein the lightning bypass system comprises at least two of the at least one stay bolt having an electrically conductive core, wherein said at least two of the at least one stay bolt are equidistantly spaced around the circumference of the bolt circle at said root end.

4. The wind turbine blade of claim 3, wherein said lightning bypass system comprises a first stay bolt of the at least one stay bolt having an electrically conductive core and a second stay bolt of the at least one stay bolt having an electrically conductive core, wherein said first and second stay bolts of the at least one stay bolt are located at opposite sides of said bolt circle at said root end.

5. The wind turbine blade of claim 4, wherein said first stay bolt of the at least one stay bolt having an electrically conductive core is located in said bolt circle adjacent the leading edge of said wind turbine blade, and said second stay bolt of the at least one stay bolt having an electrically conductive core is located in said bolt circle adjacent the trailing edge of said wind turbine blade.

6. The wind turbine blade of claim 1, wherein said lightning bypass system comprises only one of the at least one stay bolt having an electrically conductive core, wherein said one of the at least one stay bolt having an electrically conductive core is located in said bolt circle adjacent the leading edge or the trailing edge of the wind turbine blade.

7. The wind turbine blade of claim 1, wherein said lightning bypass system comprises at least one blade root bushing provided in the root end of said wind turbine blade, wherein said at least one stay bolt having an electrically conductive core is partly received in said at least one blade root bushing, wherein said at least one blade root bushing is formed from an electrically insulating material.

8. The wind turbine blade of claim 1, wherein said wind turbine blade comprises the pitch system provided at the root end of said wind turbine blade, said pitch system arranged to couple with said plurality of stay bolts of said bolt circle at said root end, wherein said at least one stay bolt having an electrically conductive core extends through said pitch system, such that said lightning bypass system is operable to conduct a lightning current received by said at least one lightning receptor through said pitch system in said electrically conductive core to the hub.

9. The wind turbine blade of claim 1, wherein said second end of said at least one stay bolt is arranged to couple with a lightning grounding system provided in the hub.

10. The wind turbine blade of claim 1, wherein said electrically conductive core projects from said second end of said at least one stay bolt.

11. The wind turbine blade of claim 10, wherein the lightning bypass system comprises an anti-flashover insulator provided at said second end of said at least one stay bolt.

12. The wind turbine blade of claim 1, wherein a ratio of a diameter of the electrically conductive core to the total diameter of the at least one stay bolt of the lightning bypass system is less than 1:2.

13. The wind turbine blade of claim 12, wherein the ratio is 1:3.

14. A wind turbine comprising at least one wind turbine blade as claimed in claim 1.

15. A lightning bypass system for a wind turbine blade, the lightning bypass system comprising:
at least one stay bolt or connector formed from an electrically insulating material, the at least one stay bolt arranged to extend from a root end of a wind turbine blade to a hub of a wind turbine, wherein each of the at least one stay bolt comprises a core of electrically conductive material, wherein the electrically insulating material of the at least one stay bolt extends through a bolting aperture defined by and beyond opposed ends of an inner ring of a pitch system,
the lightning bypass system arranged to conduct a lightning current from the wind turbine blade to the hub through each of said electrically conductive core.

16. The lightning bypass system of claim 15, wherein a diameter of each of the conductive core is less than half a total diameter of the at least one stay bolt including the conductive core.

17. A method of providing a lightning bypass system in a wind turbine blade, the method comprising the steps of:
providing at least one stay bolt formed from an electrically insulating material, each of the at least one stay bolt having a core of electrically conductive material in a bolt circle located at a root end of the wind turbine blade, wherein the electrically insulating material of the at least one stay bolt extends through a bolting aperture defined by and beyond opposed ends of an inner ring of a pitch system, and
conductively coupling each of said electrically conductive core with at least one lightning receptor of the wind turbine blade to conduct a lightning current received by said at least one lightning receptor through each of said electrically conductive core to a lightning grounding system of a wind turbine.

18. The method of claim 17, wherein said at least one stay bolt is arranged to be coupled to a mounting element provided at a hub of the wind turbine, and wherein the method comprises the step of arranging said at least one stay bolt to project from said bolt circle such that said at least one stay bolt projects through said mounting element, a free end of said at least one stay bolt standing proud of said mounting element for connection of each of the electrically conductive core of said at least one stay bolt at said free end to the lightning grounding system of the wind turbine.

* * * * *